United States Patent [19]

Meckel

[11] 4,166,580

[45] Sep. 4, 1979

[54] DRIP IRRIGATION APPARATUS

[75] Inventor: Walter Meckel, Schulgraben, Fed. Rep. of Germany

[73] Assignee: Elisabeth Christine Meckel, Schulgraben, Fed. Rep. of Germany

[21] Appl. No.: 811,237

[22] Filed: Jun. 29, 1977

[30] Foreign Application Priority Data

Jul. 19, 1976 [DE]  Fed. Rep. of Germany ....... 2632405

[51] Int. Cl.² ............................................. F16K 51/00
[52] U.S. Cl. .................................. 239/542; 239/460; 138/46; 251/205
[58] Field of Search ....................... 239/460, 541, 542; 138/46; 251/205

[56]  References Cited

U.S. PATENT DOCUMENTS

| | | | |
|---|---|---|---|
| 1,824,716 | 9/1931 | Gibbons | 138/46 X |
| 2,598,961 | 6/1952 | Andrus | 239/542 UX |
| 2,929,393 | 3/1960 | Wallace et al. | 251/205 X |
| 3,840,209 | 10/1974 | James | 239/542 X |
| 3,866,879 | 2/1975 | Elizondo et al. | 251/145 |
| 3,985,336 | 10/1976 | Bentley | 251/205 |

*Primary Examiner*—Robert W. Saifer

*Attorney, Agent, or Firm*—Jim Zegeer

[57]  ABSTRACT

There is disclosed a drip-forming device and system for drip irrigation. The device includes a tube and a rod having one end inserted into the tube by an adjustable amount, the rod being formed with at least one longitudinal groove which extends along at least part of the length of the rod and which is in communication with the part of the interior of the tube not occupied by the rod and whose depth decreases progressively away from the said one end over at least part of the length of the groove. With such devices, the output of each device can be simply adjusted to suit the local requirements, irrespective of the size, alignment and supply pressure of the complete irrigation apparatus, by adjustment of the depth of insertion of the rod in the tube. For a constant pressure the water output decreased with increasing depth of rod insertion — i.e., as the minimum cross-section of the groove at the point of insertion of the rod in the tube decreases. At different pressures depending, for example, on gradient, the water output from different devices can be made equal by varying the depth of insertion of the rods in the tubes appropriately, such depth being increased as the pressure increases - i.e., the minimum cross-section has to be decreased.

10 Claims, 4 Drawing Figures

DRIP IRRIGATION APPARATUS

BACKGROUND OF THE INVENTION

This invention relates to drip-forming devices and methods for drip irrigation apparatus and to drip irrigation apparatus incorporating such devices and methods. Drip irrigation apparatus may be used for plants in the open air or under glass or under foil or film.

Drip irrigation apparatus in which water is supplied to discrete plants in drip-form has been used for some time to irrigate cultivation of various kinds, more particularly vines, citrus fruits, peaches, apples, olives and other fruits and also many vegetable and decorative plants grown under glass and foil. Drip irrigation is particularly useful in cases where the supply of water is limited since drip irrigation consumes much less water than other forms of irrigation. There are other reasons which make drip irrigation advantageous, such as the fact that the irrigation water can be enriched with nutrients. Drip irrigation has made it possible to have intense cultivation of light highly permeable soils which have little ability to store water. The very efficient use of water also reduces labor and costs as compared with the conventional overhead or spray irrigation system. The yields too are increased due to the reduced incidence of disease.

Basically, a drip irrigation system usually comprises a pumping facility and filter at the water source, e.g., a well or surface water, lines for water distribution and drip-forming devices to distribute the water over areas of ground. A wide variety of constructions are known but most have pressure-reducing means which produce such a considerable drop in the pressure of water at the exit orifice that the water can leave only in drip form. In simple systems the output of water decreases and the working pressure decreases and are therefore unsuitable for hillsides with varying gradients. For the water output to remain constant — i.e., to remain unaffected by the working pressure — so that the systems can be used more particularly for a varying gradient and different sizes of plant, it has previously been necessary to use pressure controllers which are of very complicated construction and therefore likely to go wrong and which are also very expensive.

According to the present invention, a drip-forming device for drip irrigation apparatus comprises a tube having a smooth internal surface and a smooth surfaced rod having one end inserted into the tube by an adjustable amount, the rod being formed with at least one longitudinal groove which extends along at least part of the length of the rod and which is in communication with the part of the interior of the tube not occupied by the rod and whose depth decreases progressively away from the said one end over at least part of the length of the groove. With such devices, the output of each device can be simply adjusted to suit the local requirements, irrespective of the size, alignment and supply pressure of the complete irrigation apparatus, by adjustment of the depth of insertion of the rod in the tube. For a constant pressure the water output decreases with increasing depth of rod insertion — i.e., as the minimum cross-section of the groove at the point of insertion of the rod in the tube decreases. At different pressures depending, for example, on gradient, the water output from different devices can be made equal by varying the depth of insertion of the rods in the tubes appropriately, such depth being increased as the pressure increases - i.e., the minimum cross-section has to be decreased.

Preferably, the depth of the groove decreases continuously from the inserted end over at least part of the length of the groove thus permitting stepless adjustment of the output of the device. Preferably, the rod is engaged frictionally in the tube and its depth of insertion in the tube is capable of manual adjustment. While frictional engagement is preferred, other means of maintaining the rod position in the tube can be used, if desired.

The invention also includes, according to a further aspect, drip irrigation apparatus and method comprising a water delivery line and drip lines branching therefrom, each of the drip lines being terminated by a drip-forming device according to the first aspect of the invention. Preferably, the tube of each drip-forming device is constituted by the respective drip line.

The invention may be carried into practice in various ways but one preferred drip irrigation apparatus and the drip-forming devices thereof will now be described by way of example with reference to the accompanying drawings, in which:

BRIEF DESCRIPTION OF THE DRAWINGS

Referring to FIG. 1, a main irrigation line, tube or pipe 1, carries irrigation water under pressure from a water source (not shown) to a place which is to be irrigated. Drip lines 2 having smooth internal surfaces branch off from the main line 1 at predetermined intervals, although only two exemplary drip lines 2 are shown in FIG. 1, in viticulture approximately 6000 drip lines per hectare are used in accordance with the number of vines. A smooth surfaced rod 3 is inserted into that end of the tube constituting each of the drip lines 2 remote from the main line 1 and is retained in the drip line 2 by frictional engagement. The rod 3 is formed with at least one longitudinal groove 4 which extends from the rod end 5 in the drip line 2 along part of the rod 3, preferably over approximately four-fifths of the rod length, the depth of the groove 4 decreasing continuously from the end in the drip line to zero. In a preferred embodiment, the depth of the groove is no more than 10 percent of the diameter of rod 3. However, the groove depth variation may be in discrete steps, if desired. In one practical embodiment the rod 3 which is preferably a polyethylene extrusion, has a length a of 50 mm and an outside diameter d of 3 mm. The longitudinal groove in such a rod has a length l of 40 mm, a width b of 0.3 mm and a maximum depth t at the end 5 of 0.3 mm. As described above, the internal diameter of tube or drip line 2 engages the rod 3 to retain same in position by frictional engagement. The cross-section of the groove is U-shaped, as shown in FIG. 4, but other shapes are possible. It has been found that such a rod enables the water output to be kept constant over a gauge pressure range of from 0.08 bar (pipe laid horizontally) up to approximately 3 bar, the rod being pushed further into the drip line, e.g., manually, as the pressure increases, with the result that the minimum exit cross-section decreases so that the water output remains constant. Experiments have shown that the drip-forming device described is fully serviceable on all gradients which can conveniently be cultivated.

Figure 1:
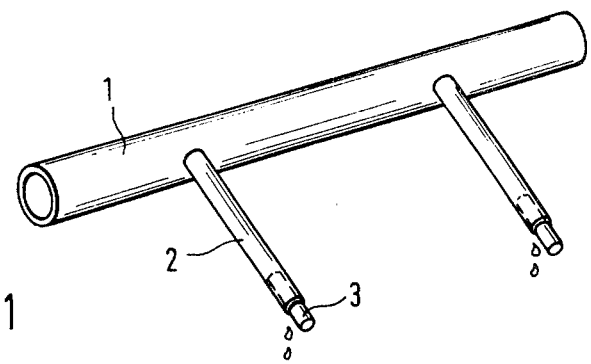
FIG. 1 is a diagrammatic view of part of the drip irrigation apparatus showing two drip-forming devices.
Figure 2:
FIG. 2 is a plan view of the rod of one of the drip-forming devices to a larger scale.
Figure 3:
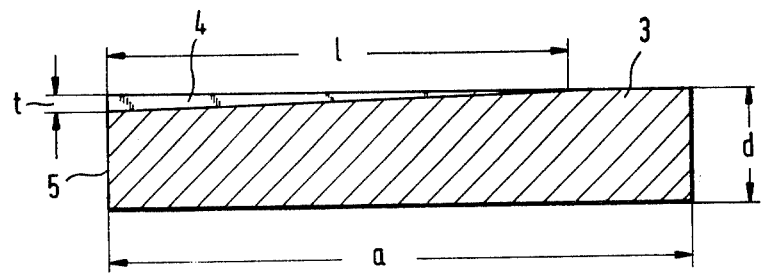
FIG. 3 is a longitudinal section through the rod on the line III—III of FIG. 2.
Figure 4:
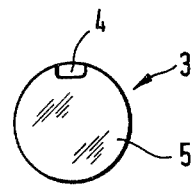
FIG. 4 is an end elevation of the rod.

In practising the method of this invention, it will be appreciated that the drip-forming devices may be branched off of branch lines of varying lengths. Pressure differentials due to difficult lengths or elevations may be encountered, such as on a hill side with varying gradients, and by adjusting the depth of the rod 3 in tube 2 at each drip device, relatively uniform irrigation can be achieved. Of course, if one wished to provide more water at one group of plants, this can easily be accomplished by depth of rod settings. If desired, drip indicators or indicia (not shown) may be on the rod, or the tube may be made transparent with appropriate markings, to indicate the drip irrigation rate for a given distance along an irrigation line of known size and source water pressure.

While I have shown a preferred embodiment of my invention and suggested several obvious adaptations thereto, it will be appreciated that other such obvious modifications and adaptations will be apparent to those skilled in the art, accordingly the invention is not deemed to be limited except as defined in the appended claims.

What is claimed is:

1. A drip-forming device for drip irrigation apparatus, said drip forming device comprising a narrow tube member having a smooth internal surface and a smooth surfaced rod having one end inserted into the tube by an adjustable amount, said rod member being formed with at least one longitudinal groove which extends along at least part of the length of the member and which is in communication with the part of the interior of the tube not occupied by said rod, the depth of said groove decreasing progressively away from the said one end over at least part of the length of the groove said smooth surfaced rod having an external surface dimension of sufficient size that it frictionally engages the smooth internal walls of said narrow tube member to frictionally retain said rod at any axial position in said tube.

2. A device as claimed in claim 1 in which the groove extends from the said one end of the said rod member and terminates before reaching the opposite end thereof.

3. A device as claimed in claim 2 in which said longitudinal groove extends over approximately four-fifths of the length of said rod member.

4. A device as claimed in claim 1 in which the maximum depth of said longitudinal groove is approximately ten percent of the rod outside diameter.

5. A device as claimed in claim 1 in which the rod is approximately 50 mm long and has an outside diameter of approximately 3 mm, and has a single longitudinal groove which has a length of approximately 40 mm, a width of approximately 0.3 mm and a maximum depth of 0.3 mm.

6. A device as claimed in claim 1 in which the rod is made of a synthetic plastic material.

7. A device as claimed in claim 6 in which the rod is made of polyethylene.

8. A device as claimed in claim 1 in which the depth of said groove decreases continuously from the said one end to the opposite end of the groove over at least part of the length of the groove.

9. Drip irrigation apparatus comprising a water delivery line and drip lines branching therefrom, each of the drip lines being terminated by a drip-forming device as claimed in claim 1, each said drip line constituting said tube member, respectively.

10. In a method of drip irrigation in which a main irrigation line carries water under pressure from a source, a plurality of drip-forming devices connected to said irrigation line at vary-distances from said source, each of said drip-forming devices including a narrow tube member having a smooth internal surface connected at one end to said irrigation line, and a smooth surfaced rod inserted in the other end of said drip tube, and means forming a groove in the rod having a depth which varies progressively from one end thereof toward the other end, whereby the cross-section of said groove at the point of insertion of said rod in said tube varies as a function of the depth of insertion of said groove into said tube, the step of frictionally maintaining the adjusted position of each of said rods in its corresponding drip tube as a function of distance the drip-forming device is located from said source whereby the water flow rate is at a selected level at each of said drip-forming devices, and the flow rate at each of said drip-forming devices being adjusted by adjusting the insertion depth of said rod in said drip tube as a function of elevation with respect to said source of water to achieve substantially uniform water flow rates at each of said drip-forming devices said insertion depth being inversely proportional to elevation with respect to said source.

* * * * *